(12) United States Patent
Kamath (10) Patent No.: US 8,879,240 B2
(45) Date of Patent: Nov. 4, 2014

(54) CONTROLLING A GAS RELEASE FROM AN ELECTRONIC COMPONENT

(75) Inventor: Ajith Kamath, Malpe (IN)

(73) Assignee: Empire Technology Development LLC, Wilmington, DE (US)

( * ) Notice: Subject to any disclaimer, the term of this patent is extended or adjusted under 35 U.S.C. 154(b) by 794 days.

(21) Appl. No.: 13/130,842

(22) PCT Filed: Dec. 29, 2010

(86) PCT No.: PCT/IB2010/056110
§ 371 (c)(1),
(2), (4) Date: May 24, 2011

(87) PCT Pub. No.: WO2012/066391
PCT Pub. Date: May 24, 2012

(65) Prior Publication Data
US 2012/0274152 A1      Nov. 1, 2012

(30) Foreign Application Priority Data
Nov. 15, 2010   (IN) .......................... 3430/CHE/2010

(51) Int. Cl.
| | |
|---|---|
| *H01G 9/12* | (2006.01) |
| *H01G 2/12* | (2006.01) |
| *H01G 9/155* | (2006.01) |
| *H01G 11/18* | (2013.01) |
| *H01G 11/80* | (2013.01) |
| *H01G 5/014* | (2006.01) |
| *H01G 2/08* | (2006.01) |

(52) U.S. Cl.
CPC .................. *H01G 2/08* (2013.01); *H01G 11/18*
USPC ........... 361/521; 361/534; 361/502; 29/25.03
(2013.01); *H01G 11/80* (2013.01); *H01G 5/014*
(2013.01); *Y02E 60/13* (2013.01); *H01G 9/12*
(2013.01)

(58) Field of Classification Search
CPC ........... H01G 2/08; H01G 5/014; H01G 9/12; H01G 11/18; H01G 11/80; H01G 11/82
See application file for complete search history.

(56) References Cited

U.S. PATENT DOCUMENTS 1,920,799 A * 8/1933 Lilienfeld .................... 361/519
2,234,042 A    3/1941 Deeley (Continued)

OTHER PUBLICATIONS

International Search Report and Written Opinion issued by the Australian Patent Office in PCT/IB2010/056110, dated Mar. 16, 2011.

*Primary Examiner* — Eric Thomas
(74) *Attorney, Agent, or Firm* — Moritt Hock & Hamroff LLP; Steven S. Rubin, Esq.

(57) ABSTRACT

Techniques are generally disclosed for controlling a release event from an electrical component. In some examples described herein, a device may include an inner packing material that is coupled to the electrical component and adapted to surround the electrical component. The inner packing material may be configured to trap gases produced by the electrical component during a release event. Additional examples described herein may include outer packing material configured to contain the inner packing material and substantially maintain a rigid shape during the release event. Further examples may include connection rods between the inner packing material and the outer packing material, wherein the connection rods are configured to resist expansion of the inner packing material. In some examples described herein, the inner packing material may be sealed to prevent a release of gas created by the release event.

20 Claims, 5 Drawing Sheets

(56) References Cited

U.S. PATENT DOCUMENTS

| | | |
|---|---|---|
| 2,900,585 A | 8/1959 | Keller |
| 3,582,722 A | 6/1971 | Dalton |
| 4,240,126 A | 12/1980 | Sanvito |
| 4,577,257 A | 3/1986 | Erhardt et al. |
| 4,754,361 A | 6/1988 | Venturini |
| 5,019,934 A | 5/1991 | Bentley |
| 6,341,708 B1 | 1/2002 | Palley |
| 7,343,843 B2 | 3/2008 | Sharpe |
| 2007/0188980 A1 | 8/2007 | Hossick-Schott |

\* cited by examiner

CONTROLLING A GAS RELEASE FROM AN ELECTRONIC COMPONENT

CROSS-REFERENCE TO RELATED APPLICATION

The present application this application is a U.S. National Phase Application pursuant to 35 U.S.C. §371 of International Application No. PCT/IB2010/056110 filed Dec. 20, 2010 which claims priority to Indian patent application serial number 3430/CHE/2010 filed on Nov. 15, 2010, the entire contents of both are incorporated by reference.

BACKGROUND

Unless otherwise indicated herein, the materials described in this section are not prior art to the claims in this application and are not admitted to be prior art by inclusion in this section.

Various electronic components enable functionality of many electronic devices in use today. For example, a cellular phone may contain various processors, resistors, inductors, capacitors, and memory. As devices become smaller, energy densities within various components may increase.

Some electrical components, such as ultracapacitors, can have high energy densities. In some cases, the high energy density associated with an electrical component may cause the component to fail. A component failure may be an explosion or venting of gas. For example, a modern capacitor has a scored top, and when the capacitor fails, the top may split open to allow the gas to vent.

SUMMARY

Techniques are generally disclosed for controlling a release event from an electrical component. In some examples described herein, a device may include an inner packing material that is coupled to the electrical component and adapted to surround the electrical component. The inner packing material may be configured to trap gases produced by the electrical component during a release event.

Additional examples described herein may include outer packing material configured to contain the inner packing material and substantially maintain a rigid shape during the release event. Further examples may include connection rods between the inner packing material and the outer packing material, wherein the connection rods are configured to resist expansion of the inner packing material.

In some examples described herein, the inner packing material may be sealed to prevent a release of gas created by the release event. In various examples, the electrical component may be an ultracapacitor. Additional examples may include a vent in the outer packing material configured to release gas pressure associated with the release event from within the outer packing material.

In some examples described herein, the device may include a pump coupled to the vent, where the pump is configured to activate responsive to detection of the release event. Further examples may comprise supports coupled to the outer packing material and configured to hold the connection rods approximately perpendicular to a surface of the inner packing material. The connection rods may be coupled to the outer packing material.

Additional examples for controlling a release event from an electrical component may include an apparatus with inner packing material coupled to the electrical component and adapted to surround the electrical component, where the inner packing material is configured to trap gases produced by the electrical component during a release event. An example may also include a rigid case.

Several examples may include at least one connection rod located between the inner packing material and the rigid case, where the connection rod is configured to resist expansion of the inner packing material. Some examples may also include at least one spring coupled to the connection rod, where the spring and the connection rod are located outside the inner packing material, and the spring is configured to provide a resistance between the inner packing material and the rigid case.

In some examples, the inner packing material may be sealed to prevent release of gas from the release event. In various examples, the electrical component may be an ultracapacitor.

In some examples, the rigid case may have a vent configured to release a gas pressure associated with the release event from within the rigid case. Further examples may comprise supports coupled to the outer packing material and configured to hold the spring approximately perpendicular to a surface of the inner packing material. In additional examples, the rigid case may contain at least one channel, where the channel configured to allow the at least one spring to expand.

Additional examples may disclose a method for controlling a release event of an electrical component. The method may include providing a rigid case to contain the electrical component and an inner packing material. Some example methods may also include inflating the inner packing material with gases to surround the electrical component when gases are produced by the electrical component during a venting incident. Additional example methods may include resisting inflation of the inner packing material with at least one connection rod that is coupled between the rigid case and the inner packing material.

In various examples, some methods may include preventing the release of gases produced by the electrical component with the inner packing material, where the inner packing material is sealed. Some example methods may also include releasing pressure from within the rigid case with a vent. Additional example methods may include detecting the release event and responsively activating a pump that is coupled to the vent, the pump configured to release pressure from within the rigid case. In several examples, the method may include providing supports to hold the at least one connection rod and resisting inflation of the inner packing material with the connection rod approximately perpendicular to a surface of the inner packing material. Additional examples may include expanding the spring within a channel in the rigid case when resisting inflation of the inner packing material.

The foregoing summary is illustrative only and is not intended to be in any way limiting. In addition to the illustrative aspects, examples, embodiments, and features described above, further aspects, examples, embodiments, and features will become apparent by reference to the drawings and the following detailed description.

BRIEF DESCRIPTION OF THE FIGURES

In the drawings.

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to devices, methods, and articles of manufacture related to controlling a release event from an electrical component, for example.

Briefly stated, techniques disclosed herein are generally related to methods and devices for controlling a release event from an electrical component. The release events may be the venting of a gas or liquid or an explosion. In some examples, the release event may be an explosion accompanied by a venting gas. Some example methods include trapping the venting gas with inner packing material. Additional examples further include, containing the venting gas within the inner packing material, where the inner packing material is sealed to prevent the release of the venting gas. Further examples include resisting the expansion of the inner packing material while the inner packing material is containing the venting gas.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Figure 1:
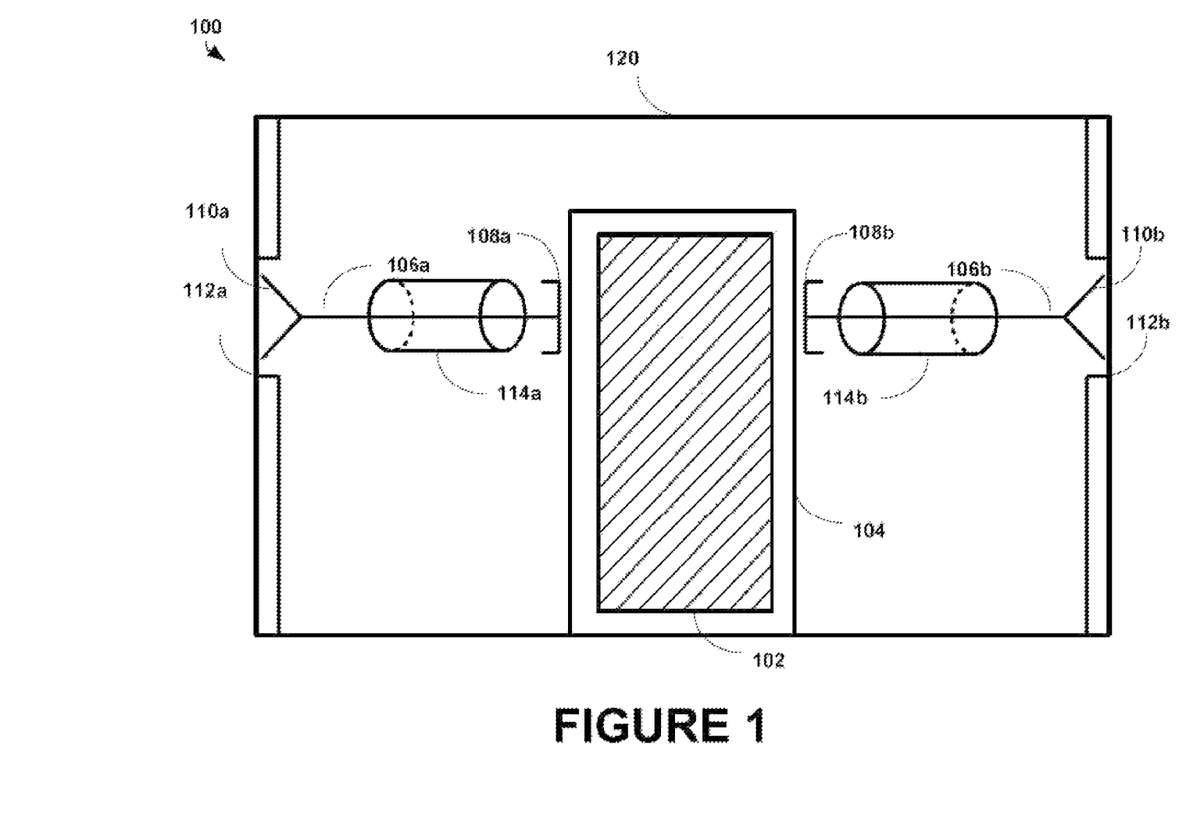
FIG. 1 is an example apparatus configured to control a release event from an electrical component.

By way of example, FIG. 1 is an example apparatus configured to control a release event from an electrical component. A release-control system 100 may be configured with one or more of an electrical component 102, an inner packing material 104, connection rods 106a-b, tips 108a-b of the connection rods 106a-b, springs 110a and 110b coupled to the connection rods 106a-b, channels 112a-b, supports 114a-b, and/or a rigid case 120. One or more of the described functions or components may be divided up into additional functional or physical components, or combined into fewer functional or physical components. In some further examples, additional functional and/or physical components may be added to the examples illustrated by FIG. 1.

In some embodiments, the electrical component 102 may be an ultracapacitor. An ultracapacitor is an electrical component that has a high energy storage density. In some examples, an ultracapacitor may have an energy density of about 30 Wh/kg (Watt-Hours per kilogram). The energy density may be 3 orders of magnitude higher than traditional capacitors, for example. Due to high energy storage, ultracapacitors may be found in hybrid automobiles to store electricity, for example.

The high energy density of an ultracapacitor, combined with a quick charge and discharge rate, may make ultracapacitors more sensitive to risk of venting or explosion. Venting may occur when a chemical reaction within the ultracapacitor causes a pressure to build up within a shell of the ultracapacitor. Eventually, the pressure can be released either as a venting of gas created by the chemical reaction or possibly as an explosion. An explosion may be considered a rapid venting of gas. The gas created during the venting process may be toxic to people. In other embodiments, the electrical component 102 may be one or more of a resistor, capacitor, processor, inductor, or other electrical component.

The electrical component 102 may be surrounded by the inner packing material 104 Inner packing material 104 may be a cloth like material, possibly similar to that used for parachutes. The inner packing material 104 may be sealed or substantially sealed. During a venting incident, the inner packing material 104 may trap the gas released. The inner packing material 104 may be adapted to inflate to contain the gas. The inner packing material 104 may contain an opening configured for insertion of the electronic component 102. The opening may later be sealed once the electronic component 102 has been placed inside.

While trapping gas associated with the release event, the inner packing material 104 may be configured to inflate, expanding in volume. In some embodiments, the inner packing material 104 may contain more volume than the volume of the electrical component 102. In some embodiments, the volume of the inner packing material 104 may be about three (3) times the volume of the electrical component 102. In other embodiments, the volume of the inner packing material 104 may be about one and a half (1.5) times the volume of the electrical component 102. The volume of the inner packing material 104 may vary depending on the size of the electrical component 102, the energy density of the electrical component 102, or the chemical composition of the electrical component 102.

In some embodiments, the connection rods 106a and 106b may be configured to resist the expansion of the inner packing material 104. By resisting expansion of the inner packing material 104, work may be extracted from the venting incident. The extraction of work may be utilized to prevent an explosion, further venting, or gas release. The connection rods 106a and 106b may be coupled to the inner packing material 104 with a physical connection. In other embodiments, connection rods 106a and 106b are not physically coupled to the inner packing material 104, but are positioned at a location where the inner packing material 104 will contact the connection rods 106a-b when the inner packing material 104 begins to expand, for example.

The connection rods 106a and 106b may be made of a rigid material to avoid bending during a release event. In some embodiments, the connection rods 106a and 106b may be made of metal. In further embodiments, the connection rods 106a and 106b may be made of carbon. Additionally, other rigid high-strength materials can be used for the connection rods.

In an example embodiment, a cylindrical rod shaped ultracapacitor may have a height of about 5 centimeters (cm) and may have a circular surface radius of about 3 cm. The length of connection rods for an ultracapacitor this size may vary from approximately 2 cm to 6 cm. This approximation is considered based on the concept of this example size corresponding to a small size smaller energy density ultracapacitor. The connecting rod length may depend on 2 parameters, maximum deviation in the height (or width) of the spring in normal and maximum compressed position and spacing between the rigid outer boundary and the inner packaging material. The size of the rods is not meant to be limiting, simply one example. Generally, many length rods can be used and varied based on different design criteria.

In various embodiments, the connection rods 106a and 106b may comprise different shaped tips 108a and 108b. The tips 108a and 108b of the connection rods 106a-b may be shaped in a way to increase resistance to expanding of the inner packing material 104 due to the venting gas. In some embodiments, the tips 108a and 108b may be flat and extend along a portion of a length of the inner packing material 104. In other embodiments, the tips 108a and 108b may be shaped like semi-circles. The semicircle tips may substantially surround the inner packing material 104.

In additional embodiments, the connection rods 106a and 106b may be coupled to the springs 110a and 110b. The springs 110a and 110b may be positioned within the channels 112a and 112b. The channels 112a and 112b are located in the rigid case 120. The channels 112a and 112b may be configured to provide support and alignment for the springs 110a and 110b as the springs 110a and 110b expand. The force associated with the inflation of the inner packing material 104 may push the connection rods 106a and 106b against the springs 110a and 110b. The springs 110a and 110b may provide additional resistance to the expansion of the inner packing material 104.

In some embodiments, the expansion of the inner packing material 104 and the compression of the springs 110a and 110b may be configured to oscillate. The oscillations may also remove energy from the venting incident by causing the apparatus 100 to do work.

In further embodiments, the springs 110a and 110b may be configured to return to an initial position when the applied force is removed. In some embodiments, the springs 110a and 110b may be nanosprings. If the apparatus 100 is small, nanosprings may be used to keep the size of the apparatus relatively small. A small ultracapacitor may be approximately 10 cm or smaller in all dimensions.

The spring size for an example ultracapacitor with a 5 cm circular surface radius and a 5 cm height may be a V shaped spring approximately of 3 cm length for each of 2 sides of the V shaped spring. The size of the rods is not meant to be limiting, but simply one example. Generally, many spring sizes and shapes can be used and varied based on different design criteria. Spring size and shape may vary depending on physical dimensions of the inner and outer packing material or the physical dimensions of the electrical component. In other embodiments, the spring size and shape may vary depending on the energy that may be released in a venting incident or explosion.

Various additional embodiments, may include the supports 114a and 114b holding or surrounding the connection rods 106a and 106b. The supports 114a and 114b may be configured to hold connection rods 106a and 106b substantially perpendicular to a surface of the expanding inner packing material 104. By providing resistance in a perpendicular direction to the surface of the expanding inner packing material 104, the supports 114a and 114b offer further opposition to the venting incident.

In some embodiments, the supports 114a and 114b may be rigid tubing mounted within the rigid case 120. The supports 114a and 114b may be a metal tube within the rigid case 120.

Various embodiments may also include a brace for holding the supports 114a and 114b. In an example embodiment, the supports may be approximately 1 cm in length each. The size of the supports may vary depending on the strength of the material used to create the supports as well as the size of the ultracapacitor.

The rigid case 120 may be designed to house all the components of the system 100. The rigid case 120 is configured to maintain a shape when the venting incident occurs. The rigid case 120 may also contain the channels 112a and 112b. The channels 112a and 112b can be configured to allow springs 110a and 110b to expand in a controlled manner, and thus, the channels 112a and 112b may provide space within the rigid case 120 for the expansion of the springs 110a and 110b.

Figure 2:
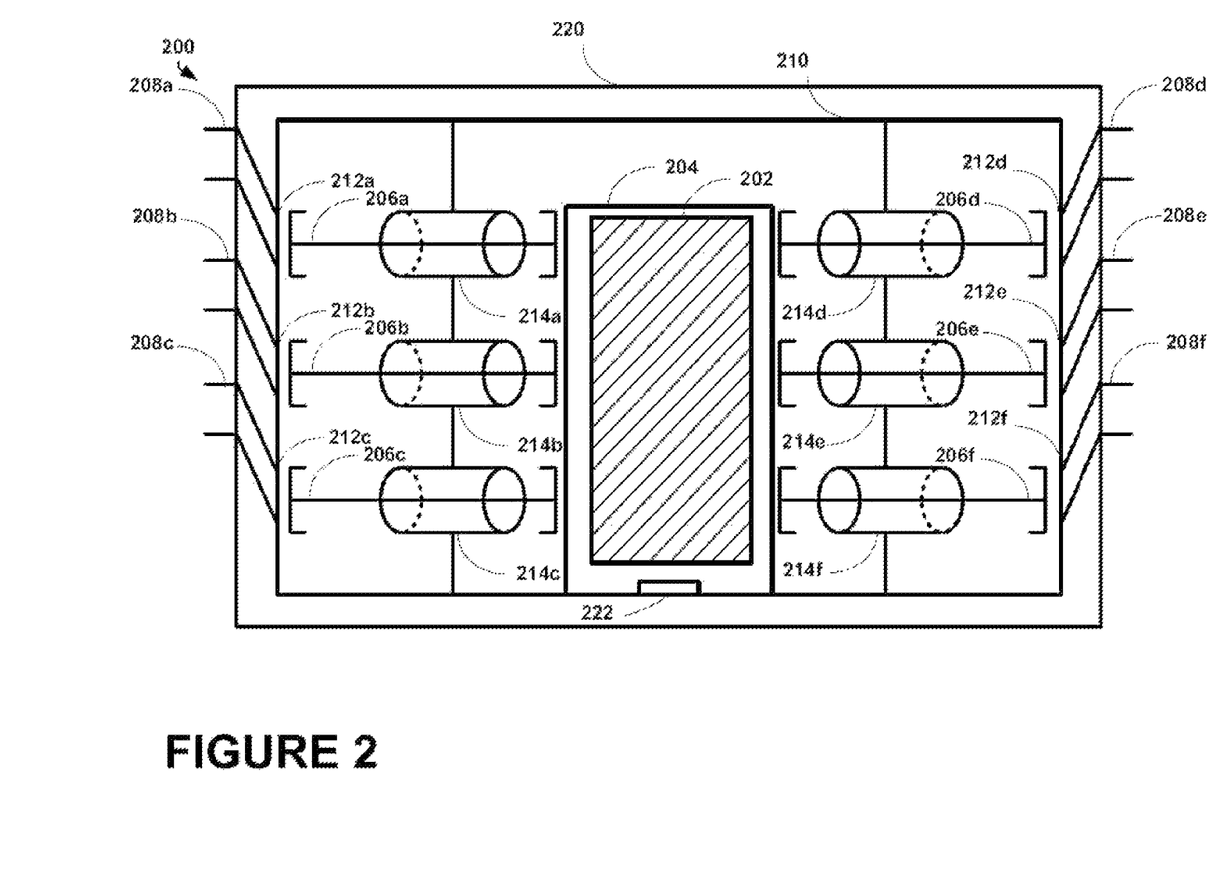
FIG. 2 is another example apparatus configured to control a release event from an electrical component.

FIG. 2 is another example apparatus 200 configured to control a release event from an electrical component according to some of methods presented herein. The release-control apparatus 200 may be configured with one or more of an electrical component 202, inner packing material 204, connection rods 206a-f, valves 208a-208f, outer packing material 210, ducts 212a-212f, supports 214a-f, sensors 222, and/or a rigid case 220. One or more of the described functions or components may be divided up into additional functional or physical components, or combined into fewer functional or physical components. In some further examples, additional functional and/or physical components may be added to the examples illustrated by FIG. 2.

In some example embodiments, the electrical component 202 may be an ultracapacitor. The electrical component 202 may be located within the inner packing material 204. Inner packing material 204 may be a cloth like material, possibly similar to that used for parachutes. The inner packing material 204 may be made from nylon. In other example embodiments, the inner packing material 204 may be made from a braided metal conduit or a nanospring mat. The material used for inner packing material 204 may be high strength and light weight. The material may also stretch under the pressure associated with the venting incident. In some embodiments, the material may return to its normal (pre-venting incident) size and shape once the force from the venting incident has been subsided.

The inner packing material 204 may be sealed. During a venting incident, the inner packing material 204 may be configured effective to trap the gas released. The inner packing material 204 may be configured to inflate to contain the gas. The inner packing material 204 may contain an opening through which the electronic component 202 can be inserted and later sealed once the electronic component 202 has been placed inside. While trapping gases, the inner packing material 204 may inflate, expanding in volume.

The apparatus 200 may also include one or more valves 208a-208f coupled to ducts 212a-212f. In some embodiments, the valves 208a-208f can be adapted to open in response to a venting incident. The valves 208a-208f may be effective to open to release pressure from within the outer packing material 210. In some embodiments, the valves 208a-208f may be activated in response to an inflating of the inner packing material 204. In a further embodiment, the valves 208a-208f may be configured to open in response to an increase in pressure within the outer packing material 210. In various example embodiments, the valves may open when a pressure threshold is met and the valves may return to a closed state when the pressure drops below the pressure threshold. The valves may open and close several times for one venting incident if the pressure inside the outer packing material oscillates above and below the pressure threshold.

In some embodiments, one or more sensors 222 may be placed within the inner packing material 204 or within the outer packing material 210 and configured to sense a venting incident. In some example embodiments, the sensor 222 may be a nano-sensor or nano-wire. In various example embodiments, the valves 208a-208f may be configured to open in response to a signal from one or more of the sensors 222.

In some embodiments, the valves 208a-208f may be located external to the rigid case 220. In other embodiments, the valves 208a-208f may be located within the outer packing material 210. In still other embodiments, the valves 208a-208f may be located between the outer packing material 210 and the rigid case 220.

The ducts 212a-212f may be coupled to the valves 208a-208f. In some embodiments, the ducts 212a-212f may comprise a physical tube from the outer packing material 210 to the rigid case 220. In other embodiments, the ducts 212a-212f may be configured to tunnel through the thickness of the outer packing material 210. In further embodiments, the ducts 212a-212f may be configured as ports through both the outer packing material 210 and the rigid case 220, without a physical connection between each. The ducts 212a-212f may be adapted effective to remove gases from within the outer packing material 210.

In some embodiments, the valves 208a-208f may comprise pumps. The pumps may be configured to activate in response to an inflating of the inner packing material 204. The pumps may also be configured to activate in response to an increase in pressure within outer packing material 210. In some embodiments, one or more sensors 222 may be placed within the inner packing material 204 or within the outer packing material 210 and configured to sense a venting incident. In various example embodiments, the valves 208a-208f may be configured to open in response to a signal from the sensors.

In some embodiments, the outer packing material 210 and the rigid case 220 may have similar physical properties. In various embodiments, both the outer packing material 210 and the rigid case 220 may be made of a strong rigid material. Some embodiments may have one or more of the outer packing material 210 or the rigid case 220 be made of metal. In some embodiments, the outer packing material 210 may be cylindrically shaped. In various embodiments, the rigid case 220 may be cylindrically shaped. In an example embodiment, the spacing between the rigid case 220 and the outer packing material 210 is about 1 cm. In other embodiments, the rigid case 220 may be much larger than the outer packing material 210, and may contain several outer packing material 210 with electrical component 202 mounted inside.

The inner packing material 204, the connection rods 206a-206f, and/or the supports 214a-214f may be substantially similar to the examples presented and described relative to FIG. 1. In other embodiments, the connection rods 206a-206f and/or the supports 214a-214f may be omitted from the system 200, for example.

Figure 3:
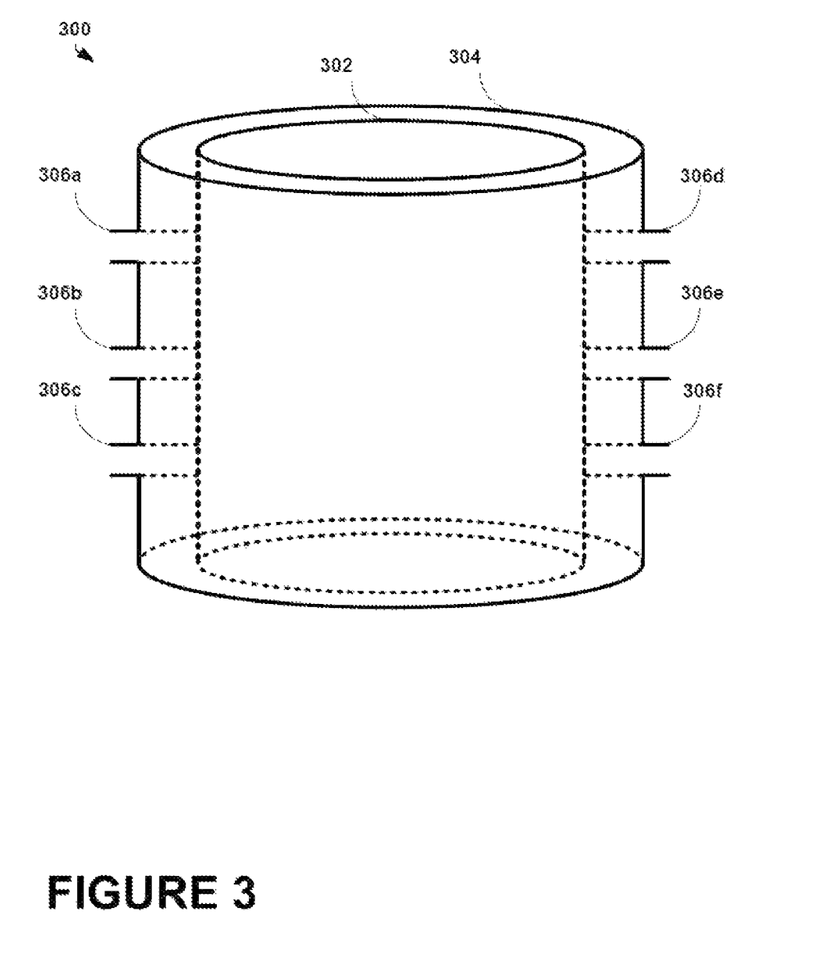
FIG. 3 is an example of outer packing material configured to control a release event from an electrical component.

FIG. 3 is an example of outer packing material configured to control a release event from an electrical component according to methods presented herein. Outer packing material 300 is shown with both an inner wall 302 and an outer wall 304, and a plurality of valves 306a-306f.

The outer packing material 300 may be approximately cylindrical in shape. Other shapes may be used for outer packing material 300, and a cylinder was chosen as one example embodiment. Both ends of the outer packing material 300 may be sealed or substantially sealed to prevent the leak of gases.

The outer packing material 300 may contain the plurality of valves 306a-306f. The valves 306a-306f may be used in response to a release event to release a pressure build up from within the outer packing material 300. In some embodiments, the valves 306a-306f may comprise pumps configured to remove gas from the outer packing material in response to a release event. The outer packing material 300 may be made from a rigid material. In some embodiments, the outer packing material 300 may be rigid enough to substantially maintain a shape during a venting incident.

In an example embodiment, the valve may be spaced approximately 1 cm apart along the length of the outer packing material. The spacing of the supports may vary depending on the strength of the outer packing material used to create the supports as well as the size of the ultracapacitor. In some embodiments, it may be desirable to have more valves to be able to more quickly remove gases associated with the explosion.

Figure 4A:
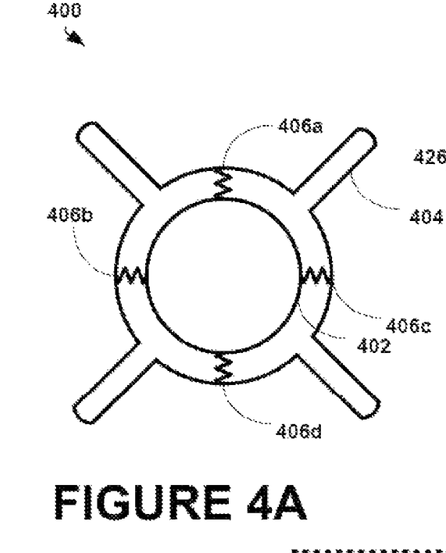
FIG. 4A is an overhead view of an example embodiment of an apparatus including inner packing material.

FIG. 4A is an overhead view of an example embodiment of an apparatus 400 including inner packing material, arranged in accordance with at least some embodiments described herein. Apparatus 400 shown in FIG. 4A presents an alternate embodiment of inner packing material, for example, that could be used with the apparatus 100, the apparatus 200, and the apparatus 300. Apparatus 400 may include one or more of an electrical component 402, inner packing material 404, and/or one or more springs 406a-406d. In some embodiments, the electrical component 402 may be attached to the inner packing material 404 with the springs 406a-406d.

In one embodiment, the electrical component 402 may be surrounded by inner packing material 404. Inner packing material 404 may be a cloth like material, possibly similar to that used for parachutes. The inner packing material 404 may be sealed. During a venting incident of the electrical component 402, the inner packing material 404 may be effective to trap the gas released. The inner packing material 404 may be adapted to inflate to contain the gas. The inner packing material 404 may contain an opening through which the electronic component 402 may be inserted and later sealed once the electronic component 402 has been placed inside. While trapping gases, the inner packing material 404 may inflate, expanding in volume.

The springs 406a-406d may be configured to resist the expansion of inner packing material 404. The springs 406a-406d may also be configured to extract work associated with the venting incident. By extracting work associated with the venting incident, damage from the venting incident may be minimized. In some embodiments, the inner packing material 404 may have larger surface area than the surface area of the electronic component 402. The excess surface area of the inner packing material 404 may allow the inner packing material 404 to expand in response to a venting incident. By expanding, the inner packing material 404 may trap gases released by the venting incident.

Figure 4B:
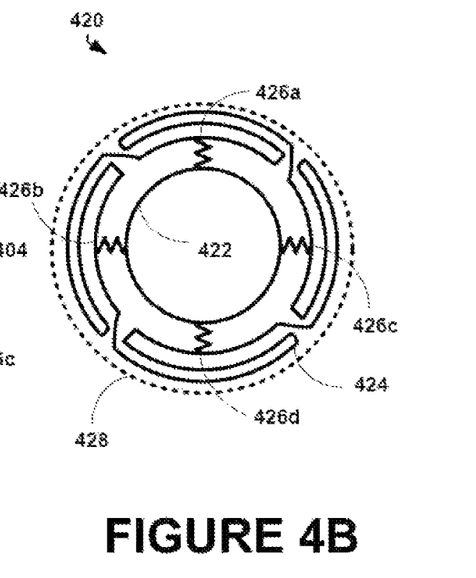
FIG. 4B is an overhead view of another embodiment of an apparatus including inner packing material.

FIG. 4B is an overhead view of another embodiment of an apparatus 420 including inner packing material, arranged in accordance with at least some embodiments described herein. The apparatus 420 may include one or more of an electrical component 422, inner packing material 424, springs 426a-426d, and outer packing material 428.

As shown by apparatus 420, the inner packing material 424, and the electrical component 422 may be placed within the outer packing material 428. The outer packing material 428 may be rigid and be configured to resist deforming during a venting incident. The inner packing material 424 may be folded and placed within the outer packing material 428 as shown. The inner packing material 424 may be folded in any appropriate manner. During a venting incident, the inner packing material 424 may expand due to gases released from the electrical component 422.

Both the springs 426a-426d and the outer packing material 428 may be configured to resist the expansion of the inner packing material 424. In some embodiments, the outer packing material 428 may be configured with at least one vent configured to allow gas from within the outer packing material to escape, reducing pressure within the outer packing material 428.

Figure 4C:
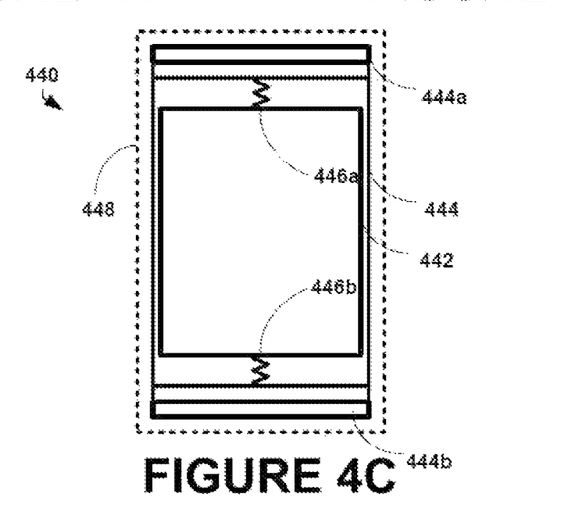
FIG. 4C is a side view of an embodiment of an apparatus including inner packing material.

FIG. 4C is a side view of an embodiment of an apparatus 440 including inner packing material, arranged in accordance with at least some embodiments described herein. The apparatus 440 includes an electrical component 442, inner packing material 444a-b, springs 446a-b, and outer packing material 448.

The apparatus 440 in FIG. 4C may be considered a different view of the embodiment shown in FIG. 4B. In one embodiment, the electrical component 442 is housed within the outer packing material 448 and the inner packing material 444. In some embodiments, the inner packing material 444 may be attached to the electrical component 442 with the springs 446a and 446b.

In further embodiments, the inner packing material 444 may be folded to fit inside the outer packing material 448. For example, in FIG. 4C, 444a and 444b represent a folded over portion of the inner packing material 444. In one embodiment, FIG. 4C may be considered as a projection of FIG. 4B when sliced along the center.

Figure 5:
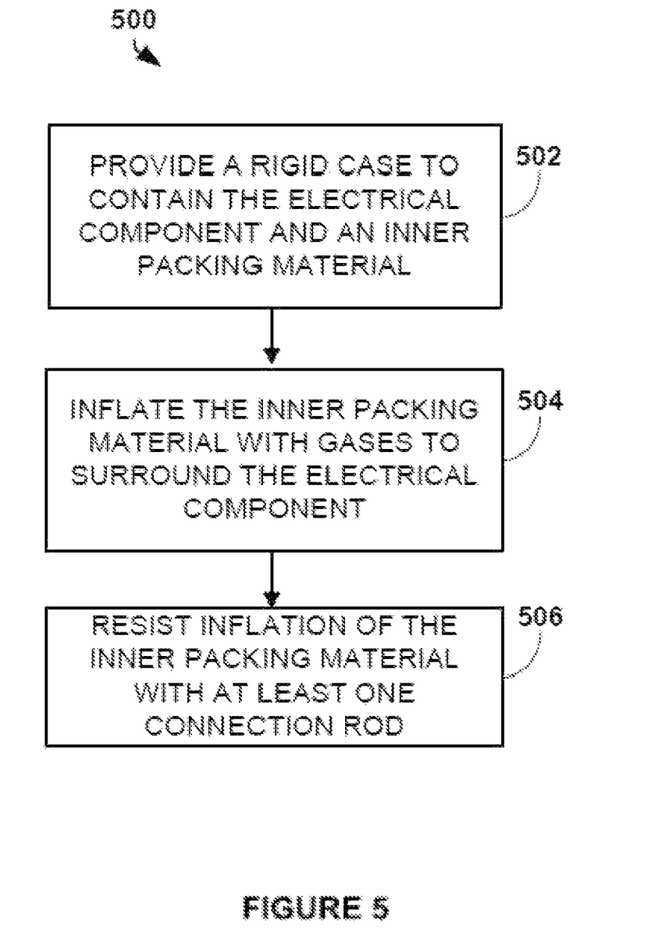
FIG. 5 is an example block diagram of a method to control a release event.

FIG. 5 is an example block diagram of a method to control a release event from an electrical component, arranged in accordance with at least some embodiments described herein. Method 500 shown in FIG. 5 may be used with one or more of the apparatus 100, the apparatus 200, apparatus 300, apparatus 400, apparatus 420, and/or the apparatus 440. Method 500 may include one or more operations, functions, or actions as illustrated by one or more of blocks 502, 504, and/or 506. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Method 500 may begin at block 502, "PROVIDE A RIGID CASE TO CONTAIN THE ELECTRICAL COMPONENT AND AN INNER PACKING MATERIAL." In some examples of block 502, a rigid case containing an electrical component and inner packing material may be provided. The electrical component may be located within the inner packing material. In some embodiments, the inner packing material may be sealed. In some embodiments, the rigid case may also contain or include rigid outer packing material.

Block 502 may be followed by block 504, "INFLATE THE INNER PACKING MATERIAL WITH GASES TO SURROUND THE ELECTRICAL COMPONENT." In some examples of block 504, the electrical component may experience a release event. The release event may comprise a venting of gas or an explosion. The inner packing material can be configured to contain the gas or explosion associated with the release event. In some embodiments, the sealed inner packing material contains all the gas created by the venting incident. In some embodiments, the inner packing material may inflate due to the force of the gas or explosion associated with the venting incident.

Block 504 may be followed by block 506, "RESIST INFLATION OF THE INNER PACKING MATERIAL WITH AT LEAST ONE CONNECTION ROD." In some examples of block 506, the at least one connection rod can be used to resist the inflation of the inner packing material. By resisting the expansion, the connection rod may be able to extract work from the venting incident. By extracting work, damage from the venting incident may be minimized.

In some embodiments, a plurality of connection rods resists the inflation. In one embodiment, the connection rods may be configured to couple between the inner packing material and a rigid case. In another embodiment, the connection rods may couple between the inner packing material and outer packing material. In additional embodiments, the connection rods are coupled to springs. The springs may be configured to expand when pressure from the inner packing material pushes against the connection rod. Additionally, the springs may return to the pre-expanded state when the pressure from the inner packing material is removed.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus configured to control a release event from an electrical component, comprising:
    inner packing material coupled to the electrical component and adapted to surround the electrical component, wherein the inner packing material is configured to trap gases produced by the electrical component during a release event;
    outer packing material configured to contain the inner packing material and substantially maintain a rigid shape during a release event; and
    connection rods between the inner packing material and the outer packing material, wherein the connection rods are configured to resist expansion of the inner packing material.

2. The apparatus of claim 1, wherein the electrical component is an ultracapacitor.

3. The apparatus of claim 1, further comprising a vent in the outer packing material configured to release a gas pressure associated with the release event from within the outer packing material.

4. The apparatus of claim 3, further comprising a pump coupled to the vent, wherein the pump is configured to activate responsive to detection of the release event.

5. The apparatus of claim 1, further comprising supports coupled to the outer packing material and configured to hold the connection rods approximately perpendicular to a surface of the inner packing material.

6. The apparatus of claim 1, wherein the connection rods are coupled to the outer packing material.

7. The apparatus of claim 1, wherein the inner packing material is sealed to prevent a release of gas.

8. An apparatus configured to control a release event from an electrical component, comprising:
    an inner packing material coupled to the electrical component and adapted to surround the electrical component, wherein the inner packing material is configured to trap gases produced by the electrical component during a release event;
    a rigid case;
    a connection rod located between the inner packing material and the rigid case, wherein the connection rod is configured to resist expansion of the inner packing material; and
    at least one spring coupled to the connection rod, wherein the at least one spring and the connection rod are located outside the inner packing material, and wherein the at least one spring is configured to provide a resistance between the inner packing material and the rigid case.

9. The apparatus of claim 8, wherein the electrical component is an ultracapacitor.

10. The apparatus of claim 8, further comprising a vent in the rigid case configured to release a gas pressure associated with the release event from within the rigid case.

11. The apparatus of claim 10, further comprising a pump coupled to the vent, wherein the pump is configured to activate responsive to detection of the release event.

12. The apparatus of claim 8, further comprising supports coupled to the rigid case, wherein the supports are configured to hold the at least one spring approximately perpendicular to a surface of the inner packing material.

13. The apparatus of claim 8, further comprising at least one channel in the rigid case, wherein the channel is configured to allow the at least one spring to expand.

14. The apparatus of claim 8, wherein the inner packing material is sealed to prevent release of gas.

15. A method for controlling a release event of an electrical component, comprising:
    providing a rigid case to contain the electrical component and an inner packing material;
    inflating the inner packing material with gases to surround the electrical component when gases are produced by the electrical component during a release event; and resisting inflation of the inner packing material with at least one connection rod that is coupled between the rigid case and the inner packing material.

16. The method of claim 15, further comprising releasing pressure from within the rigid case with a vent.

17. The method of claim 16, further comprising detecting the release event and responsively activating a pump that is coupled to the vent, the pump configured to release pressure from within the rigid case.

18. The method of claim 15, further comprising providing supports to hold the at least one connection rod and resisting inflation of the inner packing material with the connection rod approximately perpendicular to a surface of the inner packing material.

19. The method of claim 15, further comprising expanding a spring that is coupled to the at least one connection rod within a channel in the rigid case when resisting inflation of the inner packing material.

20. The method of claim 15, further comprising preventing the release of gases produced by the electrical component with the inner packing material, where the inner packing material is sealed.

\* \* \* \* \*

UNITED STATES PATENT AND TRADEMARK OFFICE
CERTIFICATE OF CORRECTION

| | | |
|---|---|---|
| PATENT NO. | : 8,879,240 B2 | Page 1 of 1 |
| APPLICATION NO. | : 13/130842 | |
| DATED | : November 4, 2014 | |
| INVENTOR(S) | : Kamath | |

It is certified that error appears in the above-identified patent and that said Letters Patent is hereby corrected as shown below:

In the Specification

In Column 1, Line 7, delete "The present application this application" and insert -- The present application --, therefor.

In Column 1, Line 9, delete "Dec. 20," and insert -- Dec. 29, --, therefor.

In Column 4, Line 17, delete "104" and insert -- 104. --, therefor.

Signed and Sealed this
Eighth Day of September, 2015

Michelle K. Lee
*Director of the United States Patent and Trademark Office*